(12) United States Patent
Zeitler (10) Patent No.: US 6,721,638 B2
(45) Date of Patent: Apr. 13, 2004

(54) AGV POSITION AND HEADING CONTROLLER

(75) Inventor: David W. Zeitler, Gaines Township, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 10/140,484

(22) Filed: May 7, 2002

(65) Prior Publication Data

US 2002/0165648 A1 Nov. 7, 2002

Related U.S. Application Data (60) Provisional application No. 60/289,270, filed on May 7, 2001.

(51) Int. Cl.[7] .................................................. G05D 1/02
(52) U.S. Cl. ........................ 701/23; 701/41; 180/408; 180/409; 180/410; 180/411; 180/445; 180/446
(58) Field of Search ..................... 701/23, 41; 180/408, 180/409, 410, 411, 445, 446

(56) References Cited

U.S. PATENT DOCUMENTS

| | | | |
|---|---|---|---|
| 3,009,525 A | | 11/1961 | Liban |
| 3,147,817 A | | 9/1964 | Liban |
| 3,245,493 A | | 4/1966 | Barrett |
| 4,307,329 A | * | 12/1981 | Taylor .......................... 318/587 |
| 4,576,246 A | * | 3/1986 | Stieber et al. ............... 180/168 |
| 4,700,302 A | * | 10/1987 | Arakawa et al. ............. 701/25 |
| 4,775,024 A | * | 10/1988 | Pircher ........................ 180/168 |
| 4,908,557 A | * | 3/1990 | Sudare et al. ................ 318/587 |
| 4,996,468 A | * | 2/1991 | Field et al. .................. 318/587 |
| 5,029,088 A | * | 7/1991 | Minami ........................ 701/23 |
| 5,281,901 A | | 1/1994 | Yardley et al. |
| 5,417,299 A | * | 5/1995 | Pillar et al. .................. 180/412 |
| 5,563,787 A | * | 10/1996 | Murayama .................... 701/23 |
| 5,687,294 A | * | 11/1997 | Jeong ........................... 700/258 |
| 5,719,762 A | * | 2/1998 | Kanayama .................... 701/23 |
| 5,764,014 A | | 6/1998 | Jakeway et al. |
| 6,345,217 B1 | | 2/2002 | Zeitler et al. |

FOREIGN PATENT DOCUMENTS

| | | | | |
|---|---|---|---|---|
| EP | 207989 B1 | * | 7/1992 | ............ B62D/1/24 |
| GB | 2158965 A | * | 11/1985 | ............ G05D/1/02 |

OTHER PUBLICATIONS

Cox and Wilfong, Autonomous Robot Vehicles (1990); Muir and Neuman, Kinematic Modeling for Feedback Control of an Omnidirectional Wheeled Mobile Robot, pp. 25–31.

Cox and Wilfong, Autonomous Robot Vehicles (1990); Nelson and Cox. Local Path Control for an Autonomous Vehicle, pp. 38–44.

Cox and Wilfong, Autonomous Robot Vehicles (1990); Moravec, The Stanford Cart and the CMU Rover, pp. 407–419.

* cited by examiner

Primary Examiner—Jacques H. Louis-Jacques
Assistant Examiner—Eric Gibson
(74) Attorney, Agent, or Firm—Van Dyke, Gardner, Linn, & Burkhart, LLP (57) ABSTRACT

A method and apparatus for controlling the steering of an automatic guided vehicle (AGV) includes simultaneously correcting the vehicle's heading and position errors. The vehicle may include first and second steering control loops that determine the vehicle's position and heading errors, respectively. Separate commands are generated from these control loops to steer the vehicle in a manner that tends to reduce these errors. The vehicle may include a forward and a rearward pair of wheels. For correcting position errors, the first control loop issues the same steering command to both the forward and rearward pair of wheels. For correcting heading errors, the second control loop issues a steering command to the rearward pair of wheels that is summed together with the first control loop's steering command prior to being applied to the rearward pair of wheels.

26 Claims, 6 Drawing Sheets

AGV POSITION AND HEADING CONTROLLER

CROSS-REFERENCE TO RELATED APPLICATION

This application claims priority to commonly assigned U.S. provisional application Ser. No. 60/289,270, filed May 7, 2001, entitled AGV Position and Heading Controller, the entire disclosure of which is hereby incorporated herein by reference.

BACKGROUND OF THE INVENTION

This invention relates generally to automatic guided vehicles, and more particularly to the steering and control of automatic guided vehicles. Automatic guided vehicles, often referred to as AGVs, are driverless vehicles that are often used for material handling purposes. AGVs are capable of carrying or towing material from one point to another without the need for a driver. AGVs generally come in two types, depending upon how they guide themselves. In a first type, the AGVs guide themselves by following current-carrying wires buried in the floor. Such AGVs typically have sensors positioned on their underside which are able to detect the magnetic field created by the current flowing through the wires. By laying these wires along desired pathways, the AGV is able to follow the wires to its intended destination, thereby avoiding the need for a human to steer the vehicle.

A second type of AGV guides without the use of wires, and is generally referred to as a wireless AGV. These AGVs are capable of driving themselves from a first location to a second location without the need of wires imbedded in the floor. Instead of following the wires, the wireless AGVs use navigation sensors to determine their position and heading. This position and heading information is then used by the vehicle in order for it to automatically steer itself along a desired path. The navigation sensors may include gyroscopes, sensors for detecting magnets embedded in the floor, laser reflectors, wheel encoders, transponder sensors, and a variety of other types of sensors.

Whether of a wire or wireless type, prior art AGVs have typically steered themselves to desired locations by first determining their position, comparing this position to a desired position, and implementing an appropriate steer correction based upon the difference between the desired and measured position. The AGV repeats this process as it moves. For tricycle style AGVs that include a front steered wheel and two rear, unsteered wheels, the steering correction is applied to the front, steered wheel. For AGVs that use differential steering (steering by running side-by-side wheels at different velocities), the steering correction is translated into appropriate velocity commands for each of the side-by-side wheels and applied to them. In the past, AGVs which have guided themselves by this method have suffered from the potential to increase their heading errors while making corrections to their position. This is due to the fact the AGV can only attempt to correct its position error by making changes in its heading. Oftentimes this change in the heading creates an even larger heading error.

Figure 5:
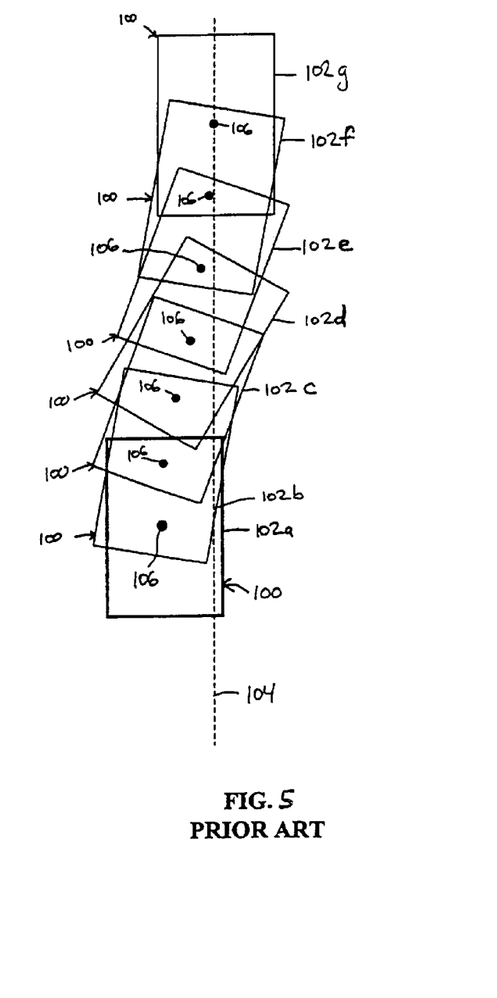
FIG. 5 is a plan, schematic view of a prior art AGV illustrated in several different positions as it guides back towards a guidepath.

An example of this heading error magnification is depicted in FIG. 5. An AGV 100 is depicted in an initial position 102a in FIG. 5. In position 102a, vehicle 100 is oriented parallel to a guidepath 104, and thus has no heading error. Vehicle 100 includes a center guidepoint 106 which denotes the point on the vehicle which the vehicle considers to be its position. Stated alternatively, guidepoint 106 is the point on the vehicle which the vehicle attempts to maintain over guidepath 104. Therefore, in initial position 102a, vehicle 100 is laterally offset to the left of guidepath 104. In response to this position error, vehicle 100 would turn its wheels to the right to thereby steer back toward guidepath 104. As illustrated in positions 102b, c, d, e, and f, the steering of vehicle 100 back toward guidepath 104 will cause vehicle 100 to change its orientation. In position 102b, vehicle 100 has rotated several degrees in a clockwise direction and is no longer oriented parallel to guidepath 104. Vehicle 100 therefore has gone from position 102a, in which it had no heading error (i.e., it was parallel to guidepath 104), to position 102b, in which its heading is different from the orientation of guidepath 104. In position 102c, vehicle 100 has rotated even further in a clockwise direction, thus increasing its heading error with respect to guidepath 104 even further. Thus, the correction of the position error of vehicle 100 in initial position 102a is only corrected by increasing the heading error of vehicle 100.

Figure 7:
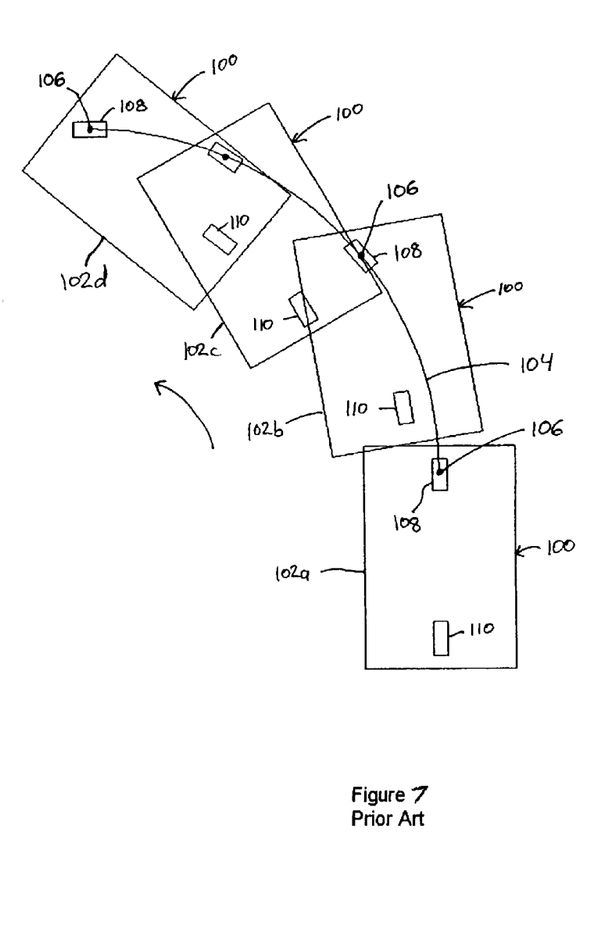
FIG. 7 is a plan view of an AGV turning a corner in accordance with a prior art method of steering.

There are several disadvantages resulting from the AGV control scheme illustrated in FIG. 5. First, as can be seen in FIG. 5, the rotation of vehicle 100 increases the necessary width of the corridor down which vehicle 100 travels. Therefore using AGVs which steer as illustrated in FIG. 5 require corridors of sufficient width to accommodate the rotation of the AGV as it steers itself along the guidepath. Additionally, AGVs that guide in the manner illustrated in FIG. 5 often have severe heading errors after they have guided around a curved or arced portion of a guidepath. As the vehicle completes the turn, it often has a significant heading error that only decreases after a significant amount of straight guidepath has been traversed. This is illustrated in FIG. 7 wherein an AGV 100 includes a front steered wheel 108 and an unsteered rear wheel 110 (as well as a suitable number of support casters which are not illustrated). The point above front wheel 108 is assumed to be the guidepoint 106, and vehicle 100 is illustrated in four different positions in which guidepoint 106 is perfectly aligned with a guidepath 104 (i.e. no position error). As can be seen, when vehicle 100 reaches position 102d, it is substantially misaligned with guidepath 104. Thus, it is virtually impossible to have vehicle 100 stop immediately after this turn and be oriented in the same direction as guidepath 104. These and other disadvantages arise from prior art methods of steering and controlling the movement of AGVs. The desire for an AGV control method that overcomes these disadvantages can therefore be seen.

SUMMARY OF THE INVENTION

Accordingly, the present invention provides a method for controlling an automatic guided vehicle which overcomes these and other disadvantages of prior art guidance methods. The present invention not only allows for AGV corridors to be narrower, but it more accurately controls the heading of AGVs as they traverse turns. The present invention provides the AGVs with a method of independently simultaneously being able to control both their heading and position.

According to one aspect of the present invention, a method for controlling an automatic guided vehicle includes measuring the AGV's heading and location. Any error between the AGV's measured heading and desired heading is determined. Also, any error between the AGV's measured location and a desired location is determined. The vehicle is then steered to simultaneously attempt to reduce both the error between the AGV's measured heading and desired heading and also the error between the AGV's measured position and the desired position.

According to another aspect of the present invention, a method for controlling an automatic guided vehicle includes measuring the AGV's heading and location, along with providing a first control loop that generates a steering command based upon any difference between the measured AGV heading and a desired AGV heading. A second control loop is also provided that generates a steering command based upon any difference between the measured AGV position and a desired AGV position.

According to yet another aspect of the present invention, a method for controlling an automatic guided vehicle is provided. The method includes measuring the AGV's position and determining a desired position for the AGV. The AGV's measured position and desired position are compared and a steering command is generated for the AGV based upon any difference between the measured position of the AGV and the desired position of the AGV. The steering command alters the AGV's position without altering the AGV's orientation as the AGV moves.

According to still another aspect of the present invention, an apparatus is provided for controlling an AGV. The apparatus includes a first and a second controller, each of which may be implemented in separate hardware modules or resident as separate control equations resident in a single processor. The first controller determines any difference between the vehicle's measured position and a desired position and outputs a command that tends to reduce any such difference. The second controller determines any difference between the vehicle's measured heading and a desired heading and outputs a command that tends to reduce any such difference.

In other aspects of the invention, the AGV includes first and second sets of wheels that are spaced apart longitudinally on the vehicle. A steering command adapted to correct the vehicle's position is applied to the first set of wheels. A steering command adapted to correct the vehicle's heading is added to the steering command adapted to correct the vehicle's position and the sum is applied to the second set of wheels. The desired heading and desired position may both be derived from a guidepath stored or created onboard the AGV.

The present invention enables an AGV to simultaneously control both its heading and position. Thus, heading errors can be corrected without significantly affecting the vehicle's position error, if any. Similarly, any error in the vehicle's position can also be corrected without significantly affecting the vehicle's heading. This type of control allows a vehicle to take tighter turns, more accurately control heading, and move down narrower corridors. These and other benefits, results, and objects of the present invention will be apparent to one skilled in the art, in light of the following specification when read in conjunction with the accompanying drawings.

DESCRIPTION OF THE PREFERRED EMBODIMENTS

Figure 1:
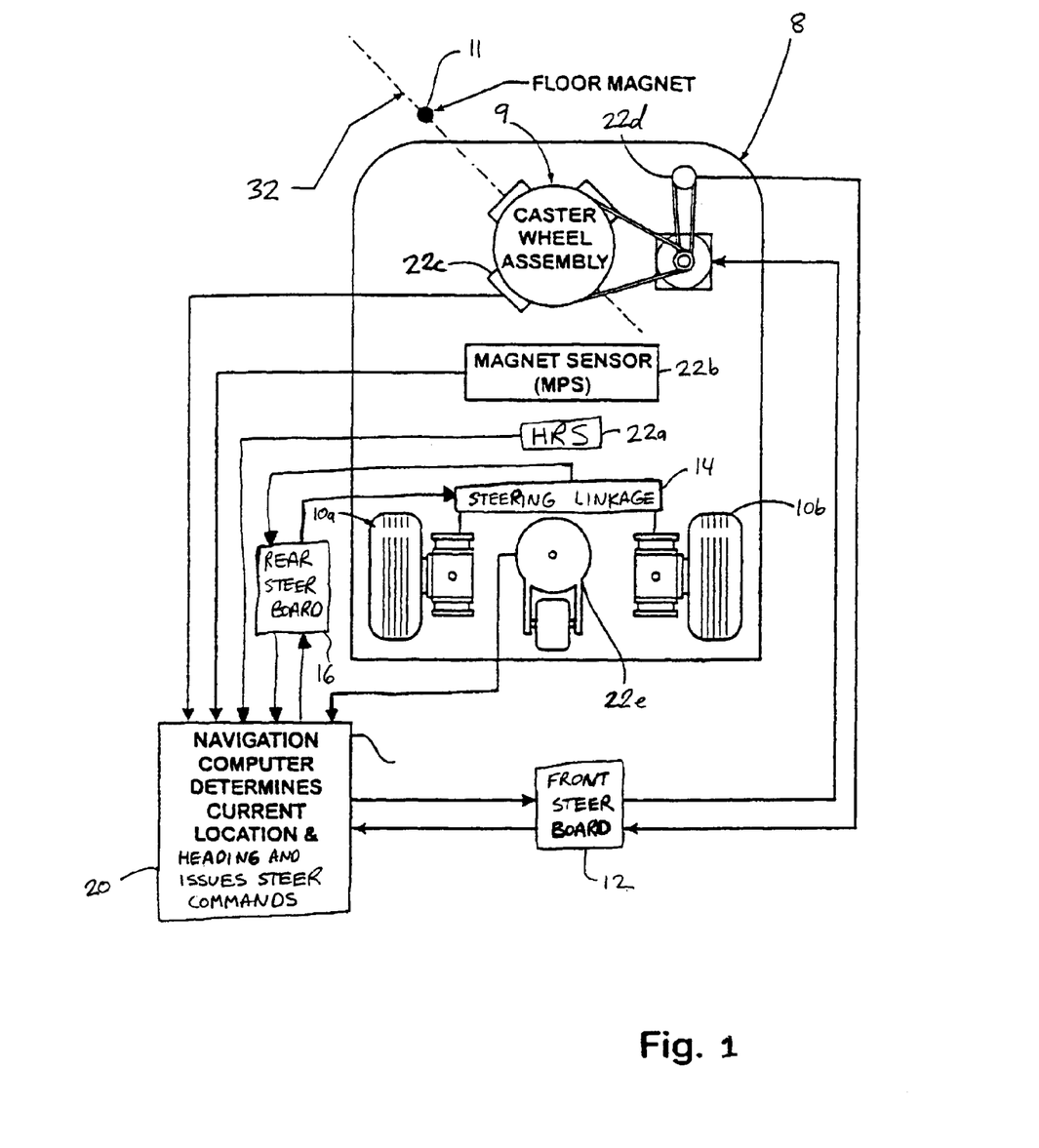
FIG. 1 is a schematic, plan view of an AGV according to one embodiment of the present invention.

The present invention will now be described with reference to the accompanying drawings wherein the reference numerals in the following description correspond to like-numbered elements in the several drawings. An example of an AGV 8 that can be used in accordance with the present invention is depicted in FIG. 1. It will be understood that AGV 8 is merely an illustrative example of one type of AGV that can be used with the present invention, and that the particular physical configuration of the AGV is not limited by the present invention. AGV 8 includes a front, steerable caster wheel 9 and a pair of rear, steerable wheels 10a and b. AGV 8 further includes a plurality of navigation sensors 22 a–e. Sensor 22a is a heading reference sensor. Heading reference sensor 22a may include a gyroscope or other conventional means for measuring either the vehicle's orientation, or changes in the vehicle's orientation. Magnet sensor 22b detects the relative position of AGV 8 with respect to spaced apart floor magnets 11. Sensor 22c is a distance measuring encoder, which measures the number of rotations of front wheel 9 and provides a signal corresponding to this measurement to a control system 20. Sensor 22d is an angle encoder which measures the angular orientation of front wheel 9 and provides that information to a front steer board 12. Sensor 22e is a ground track-sensor that consists essentially of an unloaded wheel whose angular orientation and number of rotations are measured and provided to control system 20.

Ground track sensor 22e may be a sensor of the type described in commonly assigned U.S. Pat. No. 5,764,014 issued to Jakeway et al., the disclosure of which is hereby incorporated herein by reference. A steering linkage 14 is also provided on AGV 8 and may include sensors for determining the angular orientation and number of rotations of rear wheels 10a and b. This information is fed through a rear steer board 16, which then passes it on to control system 20. Control system 20 uses the information received from navigation sensor 22 to determine the vehicle's current location and heading. Control system 20 then compares this measured location and heading to a target location and heading and outputs appropriate steer commands to front and rear steer boards 12 and 16, respectively. Steer boards 12 and 16 issue appropriate commands to front and rear wheels 9 and 10 to cause them to be steered in accordance with the commands issued from control system 20. As described in more detail herein, control system 20 issues steering commands that allow AGV 8 to more closely track a guidepath, such as guidepath 32.

Figure 2:
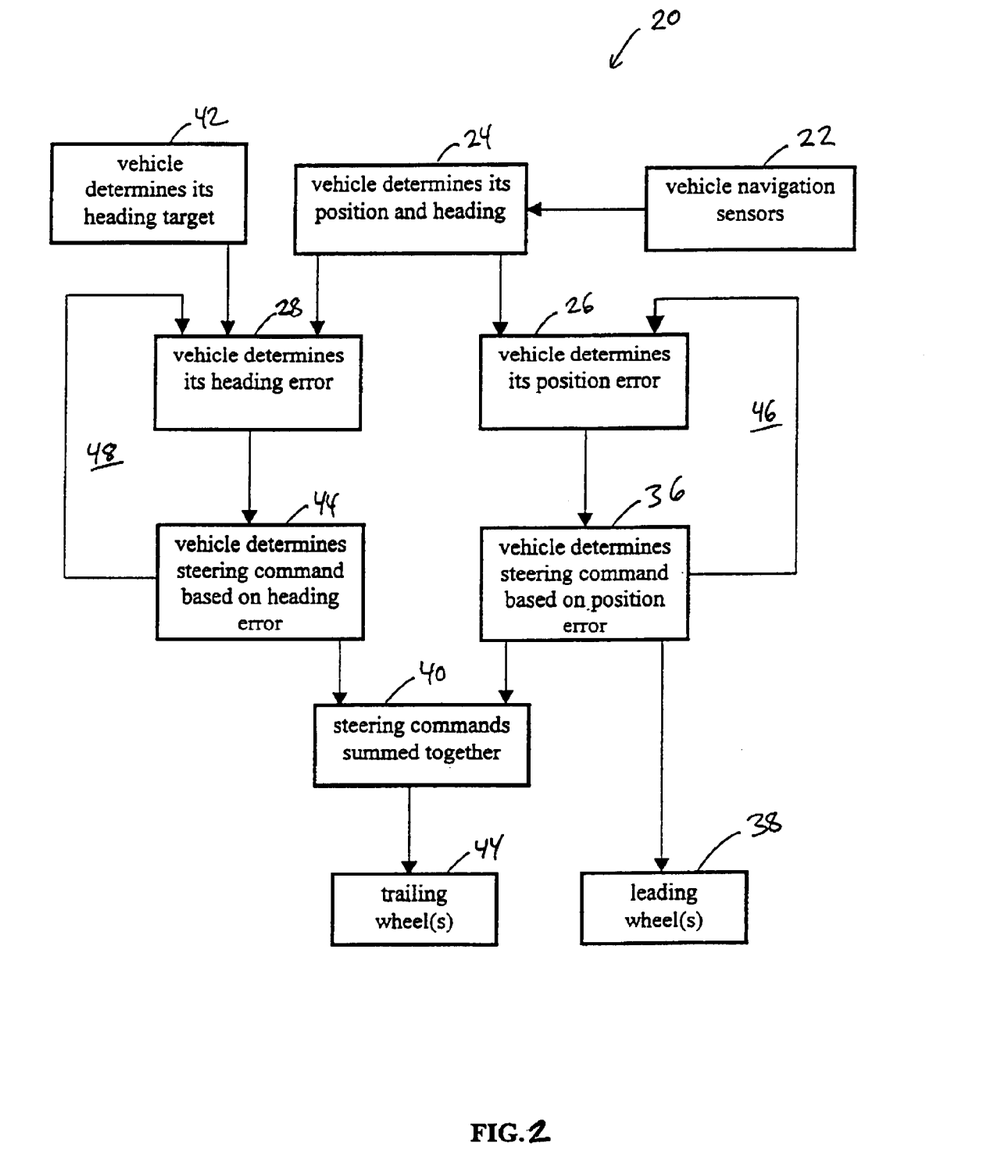
FIG. 2 is a block diagram illustrating a method of controlling an AGV according to one aspect of the present invention.

The steps followed by control system 20 for controlling an AGV according to one aspect of the present invention are depicted in block diagram format in FIG. 2. Each AGV includes one or more navigation sensors 22 which enable the vehicle to determine sufficient navigational information to follow a desired path. As described above, such navigation sensors may include a gyroscope, one or more wheel encoders, magnet sensors, transponder sensors, laser target sensors, floor wire sensors, or any other type or combination of navigational sensors. The precise type of navigational sensor(s) used with the AGV is not limited by the present invention, but rather includes any type of sensor or sensors that are able to provide position and heading information to the vehicle. The position and heading information provided by the vehicle navigation sensors must be sufficient to enable the vehicle to determine its position and heading, either absolutely within a chosen frame of reference or relative to some known reference. In AGV 8, the gyroscope or heading reference sensor 22a will provide information regarding the change in the vehicle's orientation. The distance encoder 22c will provide information as to the distance traveled by the vehicle. The magnet sensor 22b will provide periodic updates as to the position of the vehicle by detecting the vehicle's position relative to known magnets. The angle encoder 22d and ground track sensor 22e provide additional information that allows the vehicle to detect side-slipping or lateral translation which, unlike prior art systems, is a direct effect of the invention's steering scheme. Based on the output of these navigation sensors, the vehicle is able to determine its position and heading within a given frame of reference. The navigation sensors preferably provide navigational information that is updated multiple times a second, although the frequency at which this information is updated is not limited by the present invention.

At block 24 in control system 20, the vehicle determines its current position and heading based upon the latest information from the vehicle navigation sensors 22. With respect to the vehicle's position, a typical AGV will physically occupy more than a dozen square feet of surface area on a floor. For navigation and guidance purposes, however, it is typically desirable to define the vehicle's location as the location of a particular point, called a guidepoint, on a vehicle. Guidepoint 23 represents the precise position of the AGV for purposes of navigation and guidance. The determination of the vehicle's position from the navigation sensors will therefore be a determination of the precise location of guidepoint 23 within a known coordinate frame of reference that is used. Any errors in the position of the AGV will be determined by comparing the position of guidepoint 23 with the guidepath being followed.

Figure 3:
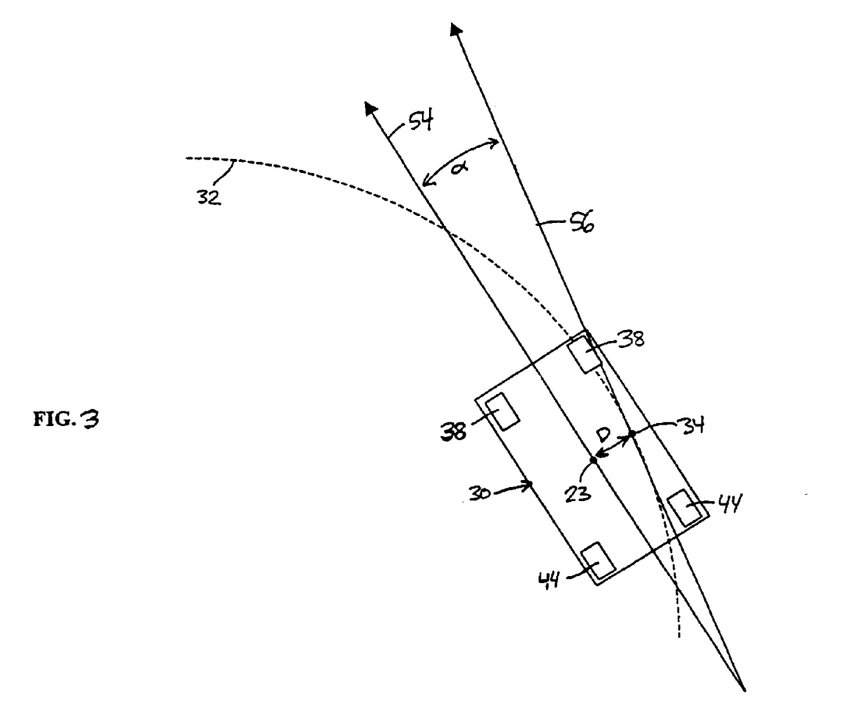
FIG. 3 is a plan view of an AGV following a curved section of a guidepath.

The information that is determined in block 24 is split between blocks 26 and 28. At block 26, the vehicle uses the measured vehicle position as determined in block 24 to determine its position error. Specifically, the vehicle accomplishes this by comparing its measured position of guidepoint 23 to a desired position. While the desired position can constitute any position within the scope of the invention, the desired vehicle position typically would be the closest point on the guidepath which the vehicle is following. An example of this is illustrated in FIG. 3. FIG. 3 depicts a vehicle 30 which is following a curved guidepath 32. The guidepoint 23 of vehicle 30 is closest to a point 34 on guidepath 32. Thus, in one example, block 26 would determine the difference between guidepoint 23 and the closest point 34 on guidepath 32 in block 26. This distance is identified as distance D in FIG. 3. This distance represents a position error, as the vehicle would desirably be positioned, but is not, at point 34 on guidepath 32.

After the vehicle position error has been determined in block 26, the position error is fed into block 36, which implements a steer control command based upon the determined position error from block 26. The steering command may be determined based upon a simple proportional formula in which the steering command is proportional to the distance error determined in block 26. One example of such a simple, proportional control equation is as follows:

$$S = K*D$$

where
S = the angular steering command;
K = a proportionality constant having units of angle/distance; and
D = the position error, measured in units of distance.

Alternatively, the steering command may be based upon any other type of control equation, such as proportional, integral, derivative, or some combination thereof, of control systems. It may also be desirable to structure the steering command such that it is based upon the speed of the vehicle at that moment. As noted, the invention encompasses any type of steer control equation. The steering command that is output from block 36 is transmitted and applied both to leading wheels 38 and a block 40. Leading wheels 38 refer to the wheels at the front or forward end of the vehicle. Because the vehicle may be bi-directional, that is, capable of traveling either forward or backward, the leading wheels 38 may refer to different wheels on the vehicle depending upon which direction the vehicle is currently moving in. If AGV 8 is moving forward, front wheel 9 constitutes the sole leading wheel 38 while rear wheels 10a and b constitute the trailing wheels 44. The command for block 36 to leading wheels 38 either commands the wheels to turn to a specified orientation (i.e. an absolute orientation), or to turn by a specified amount (i.e. a change in orientation).

As noted previously, the measurement of the vehicle's heading in block 24 is passed on to block 28. In block 28, the vehicle determines its heading error by comparing its measured heading to a target heading that is fed in from block 42. The target heading may be derived from any source and in any manner within the scope of the invention. Typically, the target heading will correspond to the heading of the guidepath at the closest point 34. For straight segments of guidepath, the desired heading would be the angle of the straight segment in a known frame of reference. When the vehicle is following an arc section of guidepath, the target heading would be the angle of the line tangent to the closest point 34 in the known frame of reference. It will, of course, be understood that the target heading could be derived independently of the guidepath, such as by being transmitted to the vehicle from an off-vehicle controller or through other means. Regardless of the source of the heading target, block 28 will compare the measured heading from block 24 to this heading target. The difference between the measured heading and the target heading represents a heading error which is fed to block 44. Block 44 uses a steering equation, or other means, to output a steering command based upon the heading error determined in block 28. As with block 36, the invention encompasses any type of steering equation, such as a proportional, integral, derivative, or other type of equation. The speed of the vehicle may also be taken into account in determining the steering command output from block 44. The steering command output of block 44 is passed to block 40, where it is summed together with the steering command output from block 36. For example, if block 36 outputs a steering command of positive five degrees in a known frame of reference, and block 44 outputs a steering command of negative two degrees in the known frame of reference, block 40 would add these together to yield a steering command of positive three degrees. This sum is then transmitted to the trailing wheels 44. The trailing wheels 44 refer to the wheel or wheels at the back or rear end of the vehicle. As with the leading wheels 38, the trailing wheels 44 may refer to different ones of the individual wheels on the vehicle depending upon which direction the vehicle is currently traveling in.

For AGV 8 of FIG. 1, the command from block 40 is passed to rear steer board 16 which converts the command to whatever form is necessary to control steering linkage 14. Steering linkage 14 may be a mechanical linkage that comprises conventional steering components, such as tie rods and other parts, that cause wheels 10*a* and *b* to rotate generally in unison. As would be known by one skilled in the art, it may be desirable to form steer linkage 14 such that it replicates or approximates an Ackerman steering gear or linkage. Alternatively, it would also be possible to replace steering linkage 14 with a pair of individually controllable casters for rear wheels 10*a* and *b*. In such a system, rear steer board 16 could be adapted to convert the command from block 40 to two separate commands for each of the controllable casters such that an Ackerman, or approximate Ackerman, steer is carried out. If front wheel 9 is replaced by two spaced wheels, such as is illustrated in FIG. 3, it may be desirable to apply the steering command from block 36 to each leading wheel in such a way that the wheels replicate or approximate Ackerman steering.

Figure 8:
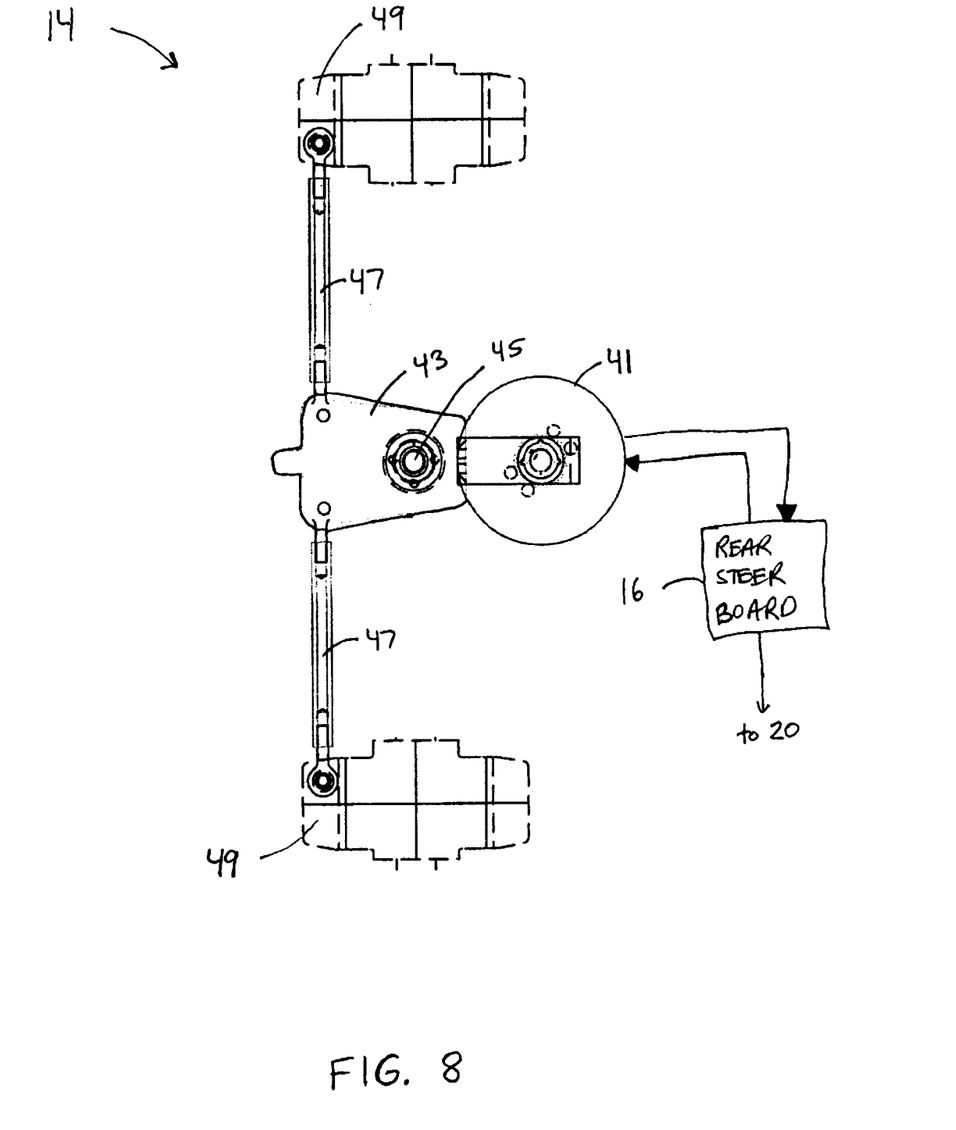
FIG. 8 is a plan view of a steering linkage used in one embodiment of the invention.

One method of implementing steering linkage 14 is depicted in FIG. 8. Steering linkage 14 in FIG. 8 includes a motor 41 that is operationally coupled, such as via a chain or other means, to a steer plate 43. Steer plate 43 is rotatable about a main axis 45. Steer plate 43 has two tie rods 47 attached to it on opposite sides that extend outwardly to two wheel supports 49. When motor 41 is activated, steer plate 43 is rotated about main axis 45 which causes the wheel supports 49, as well as the attached rear wheels 10*a* and *b*, to be rotated through the action of tie rods 47. Due to the configuration of steering linkage 14, the rotation of rear wheels 10*a* and *b* approximates an Ackerman steering solution. The steering command output from rear steer board 16 to motor 41 is therefore automatically converted, through the mechanical configuration of steering linkage 14, into an approximate Ackerman steering command. Steer plate 41 may include an angle encoder (not shown) that provides a signal to rear steer board 16 indicating its current angular orientation. This signal may be used as part of a closed-loop feedback system for controlling the orientation of steer plate 41, and thus, the orientation of rear wheels 10*a* and *b*. This signal may also be passed from rear steer board 16 back to controller 20 for navigation purposes. As noted, other types of steering linkages can be used in conjunction with the present invention.

As can be seen in FIG. 2, blocks 26 and 36 form a first control loop 46 for controlling the vehicle's position. After the AGV has determined its position error and output a corresponding steering command based upon that position error, control passes from block 36 back to block 26, and the process repeats itself. While it is preferable to repeat this loop multiple times a second, such as 50 times a second, the invention encompasses any frequency of repetition for control loop 46. It can also be seen from FIG. 2 that blocks 28 and 44 define a second control loop 48 for controlling the heading of the AGV 30. After the vehicle has determined its heading error at block 28 and output an appropriate steer correction at block 44, control passes back to block 28 and the process repeats itself. The frequency at which second control loop 48 repeats itself may be the same as the frequency at which first control loop 46 repeats itself, although this is not necessary. While it is preferable to repeat second control loop 48 multiple times per second, such as fifty times per second, other frequencies are within the scope of the invention.

The operation of control system 20 with respect to an individual AGV can best be understood with respect to FIG. 3. FIG. 3 illustrates an AGV 30 having a pair of leading wheels 38 and trailing wheels 44. AGV 30 in FIG. 2 is depicted being oriented in a direction identified by arrow 54. Were AGV 30 to move in an opposite direction from that of arrow 54, leading and trailing wheels 38 and 44 would be reversed. AGV 30 is displaced from closest point 34 on guidepath 32 by a distance labeled D. It will be assumed, for purposes of discussion, that the desired heading for the vehicle depicted in FIG. 3 is that denoted by arrow 56. Arrow 56 passes through closest point 34 on guidepath 32 and is tangent to guidepath 32 at guidepoint 34. Thus, vehicle 30 in FIG. 3 has a position error equal to the distance D, and a heading error $\alpha$ equal to the angular difference between arrows 54 and 56. Block 26 of control system 20 will thus output a position error equal to the length of distance D. Block 28 of control system 20 will output a heading error $\alpha$, which is equal to the angular difference between arrows 54 and 56. At block 36, control system 20 will output a command to leading wheels 38 based upon, at least in part, the magnitude of the quantity D. This command will also be output to trailing wheels 44, although it will be summed together with the output from block 44 prior to being applied to trailing wheels 44. Therefore, were there to be no heading error, the steering command output from block 36 to leading wheels 38 and trailing wheels 44 would be the same. Leading wheels 38 and trailing wheels 44 would therefore rotate in unison by the same amount, and vehicle 30 would begin a crabbing movement that would allow the vehicle to move in a side to side manner with respect to the guidepath without changing its orientation. Because control loop 46 provides the same steering signals to leading wheels 38 and trailing wheels 44, it allows for correction of position errors without affecting the vehicle's orientation.

The vehicle depicted in FIG. 3, however, includes a heading error $\alpha$. Control loop 48 provides the appropriate steering correction to reduce this heading error. Based on the magnitude and direction of $\alpha$, block 44 will output a steering command that will be summed together with the output from block 36. The total sum will then be transmitted to trailing wheels 44. Any changes in steering that are necessary to change the orientation of the vehicle 30 will therefore be carried out by the commands from block 44, which are transmitted to trailing wheels 44. Thus, leading and trailing wheels 38 and 44 will only receive different commands for steering when a heading error is present. Commanding leading wheels 38 and trailing wheels 44 to rotate by different amounts will cause vehicle 30 to rotate in a manner that tends to reduce the angle $\alpha$. This rotation will allow the heading error to be corrected without significantly interfering with any position error corrections that are being carried out through control loop 46.

Figure 4:
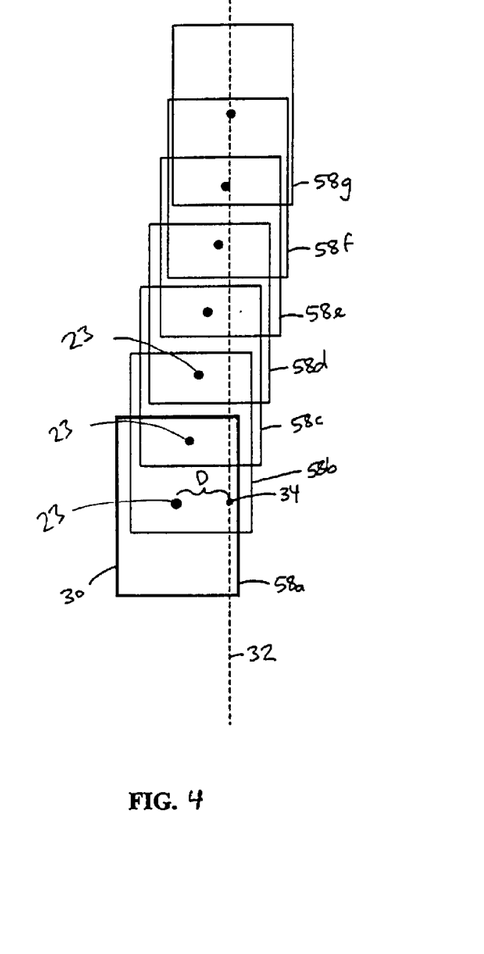
FIG. 4 is a plan, schematic view of an AGV in multiple positions as it guides back toward a guidepath.

Another example of an AGV 30 which guides back towards a guidepath 32 in accordance with one embodiment of control system 20 is depicted in FIG. 4. AGV 30 is depicted in an initial position 58*a* which is offset from guidepath 32 by a distance D. In initial position 58*a*, however, AGV 30 is oriented completely parallel to guidepath 32, and therefore has no heading error. Because there is no heading error, block 28 of control system 20 will output a zero to block 44, which in turn will not output a command to block 40. The commands to leading wheels 38 and trailing wheels 44 will therefore solely come from block 36, and will be based solely upon the position error represented initially by distance D. Because both leading wheels 38 and trailing wheels 44 will receive the same command, they will cause vehicle 30 to change its lateral position without affecting its orientation. This is depicted in FIG. 4 in positions 58b–g. As can be seen by these plurality of vehicle positions, vehicle 30 is able to move back to guidepath 32 without altering its orientation, unlike the prior art vehicle depicted in FIG. 5.

Figure 6:
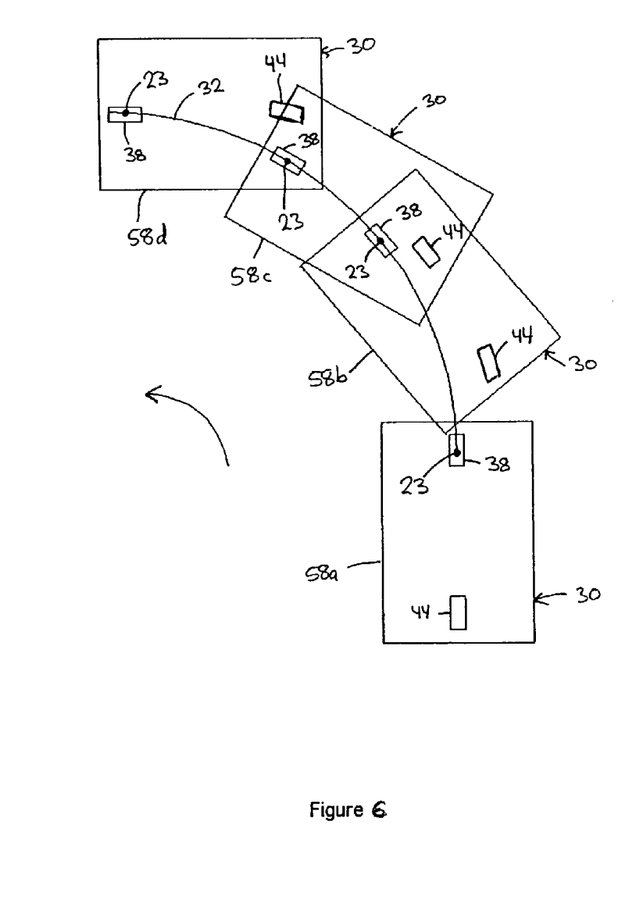
FIG. 6 is a plan view of an AGV turning a corner in accordance with one method of the present invention.

FIG. 6 also illustrates the movement of a vehicle 30 around a curved section of guidepath 32 according to the present invention. Because both leading wheel 38 and trailing wheel 44 are steered in accordance with control system 20, vehicle 30 tracks guidepath 32 with a greater fidelity than prior art vehicles, such as the one illustrated in FIG. 7. The final position 58d of vehicle 30 in FIG. 6 also has no heading error, unlike the relatively large heading error of the prior art vehicle 100 in its final turn position 102d in FIG. 7.

It will be understood that a variety of different wheel orientations and configurations can be used within the scope of the present invention other than that depicted in FIG. 3. While FIG. 3 illustrates four steerable wheels, it is also possible to implement the present invention with a single leading wheel 38 and a single trailing wheel 44, such as is illustrated in FIG. 6. This configuration would likely be implemented by the use of additional caster wheels to provide appropriate support for the vehicle. The precise placement of the vehicle's wheels can also be varied from that depicted in FIG. 3. By changing any wheel's location with respect to the center of rotation of the vehicle, it may be necessary to modify one or more of control loops 46 and 48 to account for the different kinematics of the vehicle, as would be understood by one skilled in the art. Further, if leading and trailing wheels 38 and 44 are not positioned symmetrically with respect to the center of rotation of vehicle 30, it may be necessary to have different first and second control loops 46 and 48 when vehicle 30 moves in opposite directions (if it is a bi-directional vehicle) as would be understood by one skilled in the art.

The present invention finds equal application to wire guided vehicles. Wire guided vehicles typically include a sensor that determines the vehicle's lateral position from the guidewire. At any given moment in time, the vehicle's target position can be considered to be the point on the guidewire that is laterally even with the vehicle's guidepoint (i.e. the point on the guidewire with the shortest normal distance to the guidepoint). At step 26, the wire-guided vehicle can compute its position error by determining the length of a line between this target position and the vehicle's guidepoint. The output of step 26 is used in steps 36, 38, 40, and 44 in the same manner as with a wireless AGV. A wire-guided vehicle can determine its target heading to be, for example, simply the angle of the guidewire it is currently traveling over. This can be detected by including a pair of spaced, parallel sensors oriented generally transversely to the length of the vehicle. Each of these sensors determines the vehicle's offset from the guidepath. These values can be used to determine the vehicle's relative orientation to the guidewire. This relative orientation represents the error between the vehicle's desired heading and its target heading. The relative orientation is therefore fed into step 44 and processed thereafter in the same manner as is done in a wireless AGV.

It will be understood that while the previous description discloses the use of separate single variable control equations, a single multivariate state space controller that encompasses the functions of these two controllers could also be applied with similar results, as would be obvious to one skilled in the art.

While the present invention has been described in terms of the preferred embodiments depicted in the drawings and discussed in the above specification, it will be understood by one skilled in the art that the present invention is not limited to these particular preferred embodiments, but includes any and all such modifications that are within the spirit and scope of the present invention as defined in the appended claims.

What is claimed is:

1. A method of controlling an automatic guided vehicle (AGV) comprising:
    measuring the AGV's heading;
    measuring the AGV's location;
    determining any error between the AGV's measured heading and a desired heading;
    determining any error between the AGV's measured location and a desired location; and
    steering said AGV to simultaneously attempt to reduce said error between the AGV's measured heading and desired heading and said error between the AGV's measured location and a desired location, including reducing said error between the AGV's measured heading and desired headings substantially independently of reducing said error between the AGV's measured location and desired location.

2. The method of claim 1 further including providing at least a first steerable wheel and at least a second steerable wheel on said AGV, said first and second steerable wheels being spaced apart longitudinally on said AGV.

3. The method of claim 2 wherein said steering of said AGV includes steering, at least occasionally, both said first and said second wheels.

4. The method of claim 3 further including steering said first and said second wheels in unison whenever any position error exists but no heading error exists.

5. The method of claim 3 further including changing the steering of only one of said first and second wheels when any heading error exists but no position error exists.

6. The method of claim 1 further including providing at least two first steerable wheels and at least two second steerable wheels on said AGV, said first two wheels being spaced apart longitudinally from said second two wheels.

7. The method of claim 6 wherein said steering of said AGV includes steering, at least occasionally, both said first two wheels and said second two wheels, said first two wheels being steered in unison with each other, and said second two wheels being steered in unison with each other.

8. The method of claim 1 further comprising storing a guidepath onboard said AGV and deriving said desired position from said stared guidepath.

9. The method of claim 1 further comprising storing a guidepath onboard said AGV and deriving said desired heading from said stored guidepath.

10. A method of controlling an automatic guided vehicle (AGV) comprising:
    measuring the AGV's heading;
    measuring the AGV's location;
    determining any error between the AGV's measured heading and a desired heading;
    determining any error between the AGV's measured location and a desired location;
    steering said AGV to simultaneously attempt to reduce said error between the AGV's measured heeding and desired heading and said error between the AGV's measured location and a desired location;
    providing at least two first steerable wheels and at least two second steerable wheels on said AGV, said first two wheels being spaced apart longitudinally from said second two wheels;

generating a first steering signal adapted to reduce any difference between the AGV's desired position and its measured position;

generating a second steering signal adapted to reduce any difference between the AGV's desired heading and its measured heading;

applying said first steering signal to said first two steerable wheels;

adding said first and said second signals together to create an added steering signal; and applying said added steering signal to said second two steerable wheels.

11. The method of claim 10, wherein said first two steerable wheels are leading wheels and said second two wheels are trailing wheels.

12. The method of claim 10, further including generating said first and said second steering signals multiple times per second.

13. A method of controlling an automatic guided vehicle (AGV) comprising:

measuring the AGV's heading;

measuring the AGV's location;

providing a first control loop that generates a first steering command based upon any difference between said measured AGV position and a desired AGV position;

providing a second control loop that generates a second steering command based upon any difference between said measured AGV heading and a desired AGV heading;

providing at least a first and a second steerable wheel on said AGV, said first and second steerable wheels being spaced apart longitudinally;

applying said first steering command to said first steerable wheel;

adding said first and second steering commands together; and applying the added together first and second steering commands to said second steerable wheel.

14. The method of claim 13, wherein said first steerable wheel is a leading wheel on said AGV and said second steerable wheel is a trailing wheel on said AGV.

15. The method of claim 13, further including generating said first and said second steering commands multiple times per second.

16. The method of claim 15, further including storing a guidepath onboard said AGV and deriving said desired position and said desired heading from said stored guidepath.

17. A method of controlling an automatic guided vehicle (AGV) comprising:

measuring the AGV's heading;

measuring the AGV's location;

providing a first control loop that generates a first steering command based upon any difference between said measured AGV position and a desired AGV position;

providing a first control loop that generates a second steering command based upon any difference between said measured AGV heading and a desired AGV heading;

providing at least a first and a second steerable wheel on said AGV, said first and second steerable wheels being spaced apart longitudinally;

determining whether said first steerable wheel is a leading or trailing wheel;

determining whether said second steerable wheel is a leading or trailing wheel;

applying said first steering command to the leading wheel;

adding said first and second steering commands together; and applying the added together first and second steering commands to the trailing wheel.

18. A method of controlling an automatic guided vehicle (AGV) comprising:

providing a guidepath;

measuring the AGV's position;

determining a closest point on the guidepath for the AGV;

comparing the AGV's measured position to the closest point on the guidepath for the AGV; and generating a steering command for the AGV based upon any difference between the measured position of the AGV and the closest point on the guidepath of the AGV, said steering command causing the AGV to reduce any difference between the AGV's measured position and the closest point on the guidepath of the AGV without substantially altering the AGV's heading as the AGV moves.

19. The method of claim 18, further comprising:

providing a first and a second set of steerable wheels on the AGV, said first and second sets of wheels being spaced apart longitudinally; and applying said steering command to both said first and said second sets of steerable wheels.

20. The method of claim 18, further comprising:

measuring the AGV's heading;

determining a desired heading for the AGV;

comparing the AGV's measured heading to the desired heading for the AGV; and generating a second steering command for the AGV based upon any difference between the measured heading of the AGV and the desired heading of the AGV, said second steering command causing the AGV to reduce any difference between the AGV's measured heading and the desired heading.

21. A method of controlling an automatic guided vehicle (AGV) comprising:

measuring the AGV's position;

determining a desired position for the AGV;

comparing the AGV's measured position to the desired position for the AGV; and generating a steering command for the AGV based upon any difference between the measured position of the AGV and the desired position of the AGV, said steering command causing the AGV to reduce any difference between the AGV's measured position and the AGV's desired position without altering the AGV's orientation as the AGV moves;

providing a first and a second set of steerable wheels on the AGV, said first and second sets of wheels being spaced apart longitudinally;

applying said steering command to both said first and said second sets of steerable wheels; and applying said second steering command to said second set of steerable wheels.

22. The method of claim 21, further including deriving said desired heading and said desired position from a guidepath.

23. An apparatus for controlling an automatic guided vehicle (AGV) comprising:
- a first controller, said first controller determining any difference between the vehicle's measured position and a desired position, said first controller adapted to output a first command that tends to reduce any said difference;
- a second controller, said second controller determining any difference between the vehicle's measured heading, said second controller adapted to output a second command that tends to reduce any said difference between the measured and desired heading;
- at least a first and second steerable wheel, said first and second steerable wheels being spaced apart longitudinally on the AGV; and
- wherein said first command is applied to said first steerable wheel and said second command is not applied to said first steerable wheel.

24. The apparatus of claim 23, wherein said first and second commands are added together and applied to said second steerable wheel.

25. An apparatus for controlling an automatic guided vehicle (AGV) comprising:
- a first controller, said first controller determining any difference between the vehicle's measured position and a desired position, said first controller adapted to output a first command that tends to reduce any said difference;
- a second controller, said second controller determining any difference between the vehicle's measured heading and a desired heading, said second controller adapted to output a second command that tends to reduce an said difference between the measured and desired heading; and
- a first set and a second set of steerable wheels, said first set of wheels being spaced apart longitudinally from said second set of wheels on the AGV, wherein said first command is applied to said first set of wheels and said second command is not applied to said first set of wheels.

26. The apparatus of claim 25, wherein said first and second commands are added together and applied to said second set of wheels.

* * * * *

UNITED STATES PATENT AND TRADEMARK OFFICE
CERTIFICATE OF CORRECTION

PATENT NO.   : 6,721,638 B2
DATED        : April 13, 2004
INVENTOR(S)  : David W. Zeiler It is certified that error appears in the above-identified patent and that said Letters Patent is hereby corrected as shown below:

Column 10,
Line 19 "headings" should be -- heading --.
Line 46, "stared" should be -- stored --.
Line 59, "heeding" should be -- heading --.

Column 11,
Line 59, "first" should be -- second --.

Column 13,
Line 10, insert -- and a desired heading -- after "heading" and before ",".

Column 14,
Line 9, "an" should be -- any --.

Signed and Sealed this

Fifteenth Day of November, 2005

JON W. DUDAS
*Director of the United States Patent and Trademark Office*